United States Patent [19]

Logie

[11] 3,884,002
[45] May 20, 1975

[54] PARTITION SYSTEM

[75] Inventor: Charles F. Logie, Spring Lake, Mich.

[73] Assignee: American Store Equipment Corporation, Muskegon, Mich.

[22] Filed: Mar. 15, 1973

[21] Appl. No.: 341,360

[52] U.S. Cl. .................. 52/285; 52/584; 52/585; 52/753 E; 52/754; 85/43; 312/263
[51] Int. Cl. ............................................. E04b 1/48
[58] Field of Search ............ 52/584, 239, 240, 585, 52/586, 285, 583, 753, 757, 754, 755, 58 C; 85/66, 67, 43, 79, 62; 403/246, 181, 189, 196, 292, 231; 312/263

[56] References Cited
UNITED STATES PATENTS

| 297,153 | 4/1884 | Muir | 403/292 |
|---|---|---|---|
| 2,133,204 | 10/1938 | May | 52/585 X |
| 2,305,063 | 12/1942 | Collins | 52/753 C |
| 2,540,468 | 2/1951 | Anderson | 52/585 |
| 2,747,236 | 5/1956 | French | 52/754 X |
| 2,815,997 | 12/1957 | Korb | 52/753 |
| 3,007,146 | 10/1961 | Fletcher et al. | 52/758 C |
| 3,285,633 | 11/1966 | Houvener | 52/584 X |
| 3,313,199 | 4/1967 | Houvener et al. | 85/66 |
| 3,537,736 | 11/1970 | Kroopp | 52/758 C |
| 3,567,260 | 3/1971 | Norris | 52/584 X |
| 3,653,698 | 4/1972 | Jenner | 52/584 X |
| 3,798,860 | 3/1974 | Mason | 52/285 |

FOREIGN PATENTS OR APPLICATIONS

| 1,806,019 | 5/1970 | Germany | 403/292 |
|---|---|---|---|
| 683,562 | 2/1965 | Italy | 52/583 |
| 599,620 | 11/1959 | Italy | 52/755 |
| 800,967 | 9/1958 | United Kingdom | 52/583 |
| 490,417 | 8/1938 | United Kingdom | 52/755 |

Primary Examiner—Ernest R. Purser
Assistant Examiner—Leslie A. Braun
Attorney, Agent, or Firm—Price, Heneveld, Huizenga & Cooper

[57] ABSTRACT

A partition system including apparatus for joining movable wall partitions or panels comprising an elongated, cylindrical connector received in corresponding apertures formed in the edges of at least two partitions. The connector includes threaded apertures extending transversely thereof and spaced apart a predetermined distance such that one threaded aperture is in each partition. Threaded pins or bolts having tapered heads are received in each of said threaded aperture through slightly oversized, countersunk holes formed in one surface of each of said partitions and communicating perpendicularly with the apertures in said partition edges, said holes being on centers spaced slightly farther apart than the threaded apertures. Tightening said tapered heads into said countersunk holes wedges said partitions tightly and securely together forming a joint with a minimum of visible cracks.

16 Claims, 12 Drawing Figures

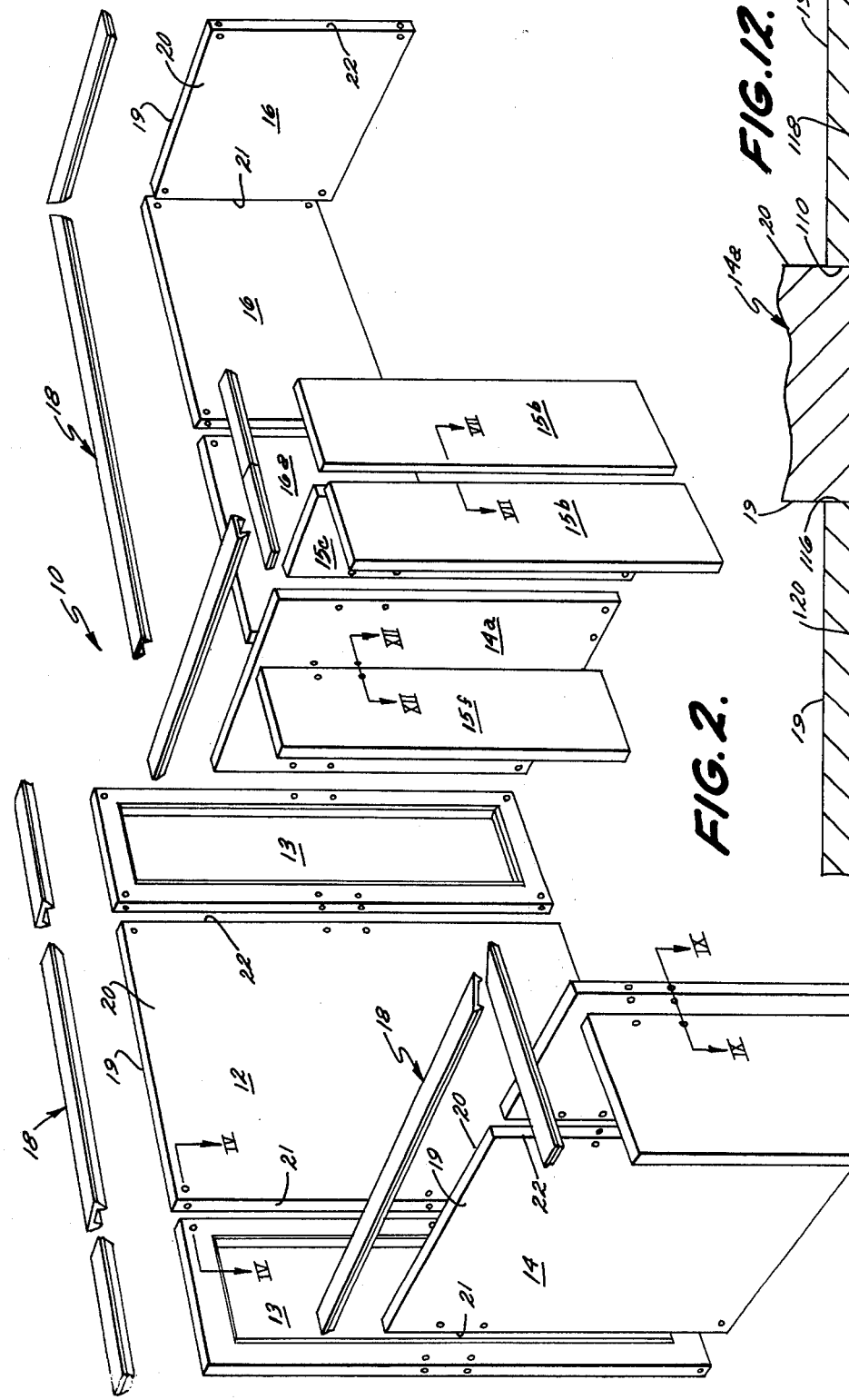
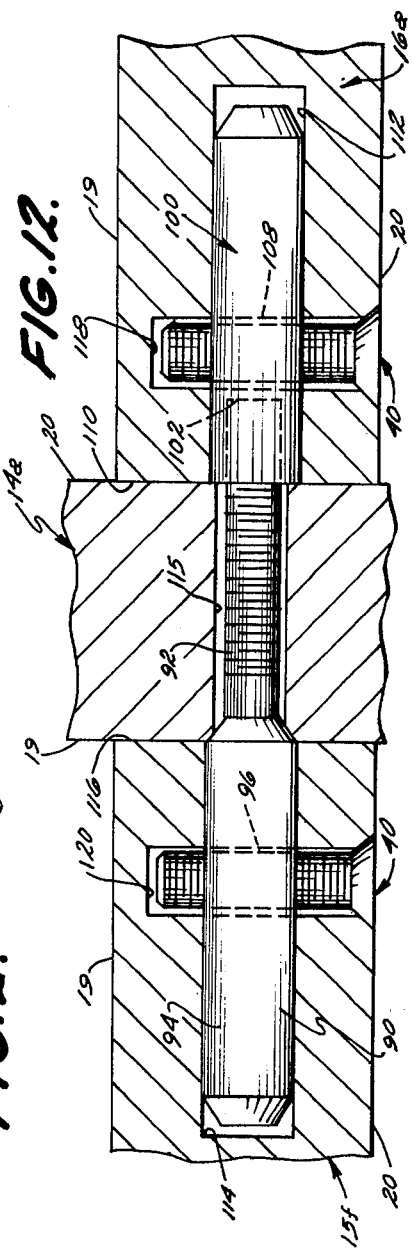

PARTITION SYSTEM

This invention relates to movable wall partition systems, and more particularly, to movable wall partition systems wherein the partitions are removably wedged tightly and securely against one another via a novel connection means.

BACKGROUND OF THE INVENTION

Portable partitions are widely used in buildings for partitioning larger areas into smaller spaces. The joinder of such movable wall partitions is a major problem. Such joinder must be accomplished with a minimum of visible cracks between the partitions in order to provide the system with an aesthetically structural soundness and pleasing appearance. The problem of preventing visible cracks is especially acute with larger, heavier partitions whose greater mass makes them more difficult to bring tightly together.

One prior art system for joining adjacent partitions uses hooks secured on one partition which are hung over receiving means secured on the other. With the larger, more bulky partitions, this system is cumbersome and difficult to use. Further, the hook and receiving means have the tendency to break or bend when supporting large masses.

Another system comprises a bolt passed through one end of one partition and received in a nut mounted in the other partition. Although forming a secure joint when tightened, access to the bolt for tightening is restricted.

The drawbacks of prior art partition joining systems have been particularly acute with respect to larger, heavier partitions. Consequently, there has been a continuing need for a partition system wherein the movable partitions are conveniently and easily joined by a means which is capable of supporting even the largest partitions while keeping the visible cracks in the joints to a minimum.

SUMMARY OF THE INVENTION

The present invention comprises a system for joining movable wall partitions via a novel connecting means which draws the partitions tightly together. The system is especially useful for securing larger, heavier wall partitions stably and in an aesthetically appealing manner. Cracks along the joints are kept to a minimum. The system is also adaptable to join various partitions in varying arrangements wherein either two or three partitions are secured together rectilinearly, at right angles to one another, or normally abutting an intermediate partition.

The invention comprises an elongated connector received in corresponding apertures formed in the edges of the partitions to be joined. The connector includes two pin-receiving apertures formed transversely to the axis of the connector on centers which are spaced a predetermined distance from the midpoint of the connector such that one pin-receiving aperture is received in each of the partitions. Each of the partitions also includes a hole formed normally through one surface of the partition and communicating with the partition aperture receiving the connector, the hole being formed on a center spaced back from the edge of the partition a distance slightly greater than the distance between the pin-receiving aperture in the connector and the midpoint of the connector. Thus, the distance between the holes in the partitions is slightly greater than the distance between the pin-receiving apertures in the connector.

Received in each of the pin-receiving apertures through the holes in the partitions are pins having tapered heads. Each of the said holes in the partition is countersunk and slightly oversized such that the pins may be received in the apertures of the connector although the holes are spaced slightly further apart. As the pins are received in the connector apertures, the tapered heads engage the countersunk areas of the holes thereby tightly and securely drawing the movable wall partitions toward or against one another or an intermediate partition such that the resulting joint between the partitions has a minimum of visible cracks. The pins are variously secured in their tightened positions.

The elongated connector is formed in varying embodiments to accommodate varying configurations and arrangements of the wall partitions. Thus, the connector may be formed in two parts, one part having a threaded extension and the other a threaded receptacle such that the connector may be passed through a transverse hole in an intermediate partition with two other partitions being abutted against the side surfaces thereof. Also, the connector having the threaded extension may be used in place of one of the pins such that two partitions may be abutted perpendicularly against one another.

These and other objects, purposes, advantages and features of the invention will become apparent from a study of the following description taken in conjunction with the drawings.

BRIEF DESCRIPTION OF THE DRAWINGS

FIG. 2 is an exploded, perspective view of a complete arrangement of movable wall partitions including the arrangement shown in FIGS. 3, 6, 8, and 11;

FIG. 12 is a fragmentary, cross-sectional plan view of yet another arrangement of the movable wall partitions joined with the connectors shown in FIGS. 6, 10, and 11.

DESCRIPTION OF THE PREFERRED EMBODIMENTS

Figure 1:
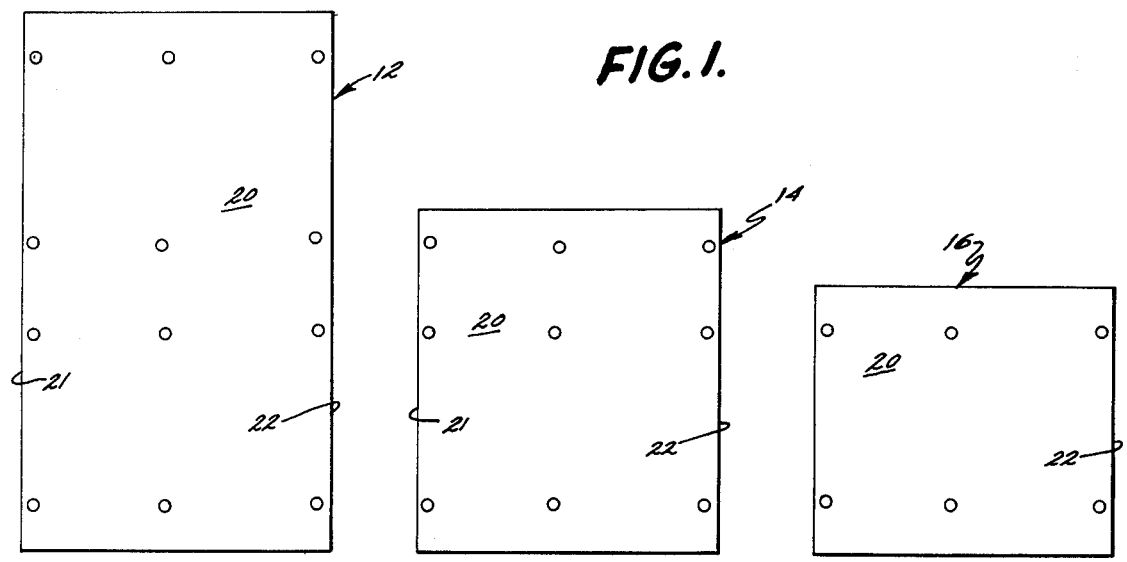
FIG. 1 is a front elevation of three sizes of movable wall partitions which may be joined with the present invention.

Referring now to FIGS. 1 and 2, the present inventive movable wall partition system 10 is shown in a typical arrangement including three sizes of movable partitions 12, 14, and 16. Partitions 12, 14, and 16 are of varying heights and uniform widths. As will be apparent from FIG. 2, however, the widths also may be varied to provide half-size or other sizes of partitions having similar heights to partitions 12, 14, and 16. Partitions 13 and 15 correspond in height to partitions 12 and 14, respectively, but are narrower. As is shown in greater detail in FIGS. 3–12, the various partitions 12–16 are secured tightly together via the novel connection system of the present invention. Depending on the height of the individual partition, between two and four of the connectors are preferably used to secure any two or three of the individual partitions together in the desired configuration. Once having been arranged and secured together, the partitions may be capped along their top edges with suitable, decorative edge caps 18 as shown in FIG. 2.

Each of the representative partitions 12–16 preferably includes two generally parallel side surfaces 19 and 20 and two generally parallel side edges or abutting surfaces 21 and 22 which generally abut one another or the surfaces 19 and 20 of other partitions when the partitions are joined as desired. The partitions are preferably solid, at least along the side edges 21 and 22 such that receptacles or apertures receiving the connectors of the present invention may be formed therein. These apertures are spaced according to the size of the partition. Thus, larger partitions generally utilize four connectors, medium sized partitions utilize three connectors, while the smaller partitions require only two connectors. Consequently, regardless of the size of the partition, the present system maintains the partition wedged tightly and securely together with a minimum of visible cracks.

Figures 3, 5:
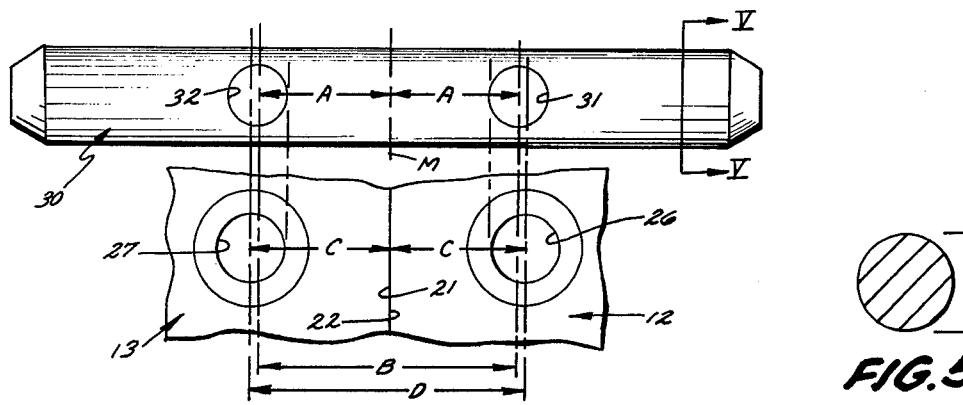
FIG. 3 is an exploded, fragmentary, front elevation of a portion of two loosely abutting movable partitions prior to being tightened together with the connector of the present invention showing the spaced relationship of the centers of the holes in the partitions and the apertures in the connector.
FIG. 5 is a cross-sectional view of the elongated connector taken along plane IV—IV of FIG. 3.
Figure 4:
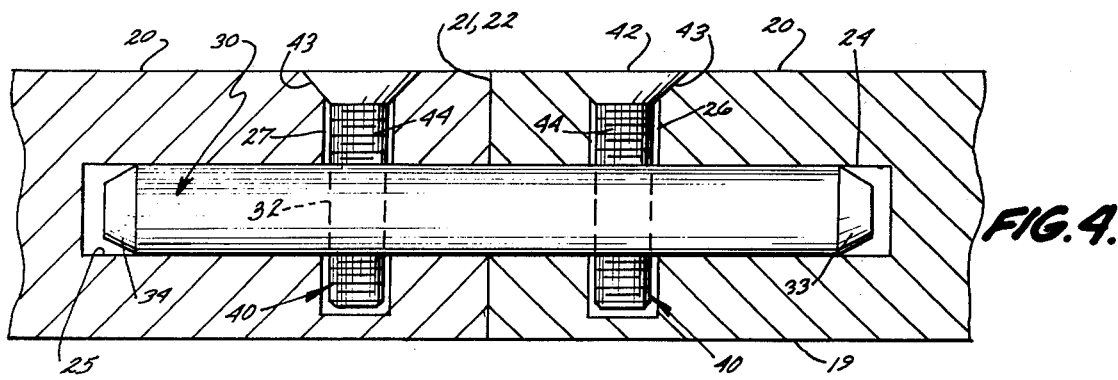
FIG. 4 is a fragmentary, cross-sectional plan view of two movable wall partitions abutting rectilinearly and joined via the present connection system.

Several varying arrangements of the connecting means utilized in the present partition system are possible, the first of which is shown in FIGS. 3 and 4. In this first arrangement, an elongated, cylindrical connector 30 extends between rectilinearly abutting partitions 12 and 13. The partitions include opposing, aligned apertures or receptacles 24 and 25, respectively, which apertures are formed normally to the side edges 21 and 22. Apertures 24 and 25 have diameters slightly larger than the outside diameter of the connector 30, represented by X in FIG. 5, such that the connector may be slip fitted therein. The total length of the aligned apertures 24 and 25 is slightly longer than the length of the connector 30 as shown in FIG. 4.

Communicating with apertures 24 and 25 in each of the partitions are holes, openings, or passageways 26 and 27, respectively, which are formed normally to side surfaces 19 or 20 of each of the partitions. Holes 26 and 27 intersect the apertures 24 and 25. The holes 26 and 27 preferably extend in the same direction such that they open on the same side of the partitions. The mouths of the holes 26 and 27 at surfaces 20 are countersunk into the partitions while the overall length of holes 26 and 27 extends past the apertures 24 and 25 but not completely through the thickness of the partitions. Holes 26 and 27 are preferably perpendicular to the longitudinal axis of apertures 24 and 25 and are, therefore, generally parallel to the planes including side edges 21 and 22. Further, holes 26 and 27 are slightly oversized, i.e., approximately 1/16 inch larger than the outside diameter of threaded pins 40, in order to allow the pins to slip easily through the holes before the partitions are tightened together.

As shown in FIGS. 3 and 4, connector 30 comprises a solid, unitary, elongated, smoothsurfaced, right circular cylinder. The cylinder, as well as the other connectors and threaded pins described herein, is formed from hardened steel or another strong, rigid metallic material. The cylinder 30 includes threaded apertures 31 and 32 which are formed on centers perpendicular to the longitudinal axis thereof, the apertures extending in the same direction and, therefore, being parallel. The centers of theaded apertures 31 and 32 are spaced from the center line M of connector 30 an equivalent distance represented by A in FIG. 3. The total distance therebetween is, therefore, B. Connectors 30 also include beveled ends 33 and 34 which facilitate the insertion of the connector into apertures 24 and 25.

As shown in FIG. 4, each of the threaded apertures 31 and 32 receives a threaded pin 40 through holes 26 and 27 provided in partitions 12 and 13. Threaded pins 40 include enlarged, tapered heads 42 having conical surfaces 43 and threaded shanks 44 which are received in apertures 31 and 32. As shown in FIG. 3, prior to the tightening of the pins in the holes, the centers of holes 26 and 27 are each spaced an equivalent distance away from edges 21 and 22 represented by C in FIG. 3. The total distance between the centers of the holes when the partitions 12 and 13 are loosely abutting against one another prior to being tightened together is, therefore, represented by distance D in FIG. 3. Since the distance C is slightly greater than the distance A, the total distance D is greater than the distance B. In the preferred embodiment, distance D is approximately one sixty-fourth inch larger than distance B.

Although threaded apertures 31 and 32 are spaced more closely together than are holes 26 and 27, pins 40 easily slip through the holes 26 and 27 during the assembly of the partitions since the holes are made slightly over size as mentioned above. This allows pins 40 to be easily threaded into apertures 31 and 32 which are actually off center with respect to holes 26 and 27 prior to the tightening of the conical surfaces 43 against the countersunk areas of the holes. After tightening, the pins 40 are centered within holes 26 and 27 since the partitions are wedged tightly together by tapered heads 42 as shown in FIG. 4.

As will now be understood, the difference in the spacing of holes 26 and 27 and threaded apertures 31 and 32 in combination with the wedge means provided by the conical surfaces of the heads 42 engaging the countersunk areas of holes 26 and 27 provide a wedging action which forces the partitions 12 and 13 together. The wedging action is brought about by threading or screwing the threaded pins 40 into threaded apertures 31 and 32 through holes 26 and 27. As the conical surfaces 43 of heads 42 engage the countersunk areas of holes 26 and 27, the two surfaces cam against one another forcing the partitions 12 and 13 towards one another whereby holes 26 and 27 tend to adopt the spacing of threaded apertures 31 and 32.

Figure 7:
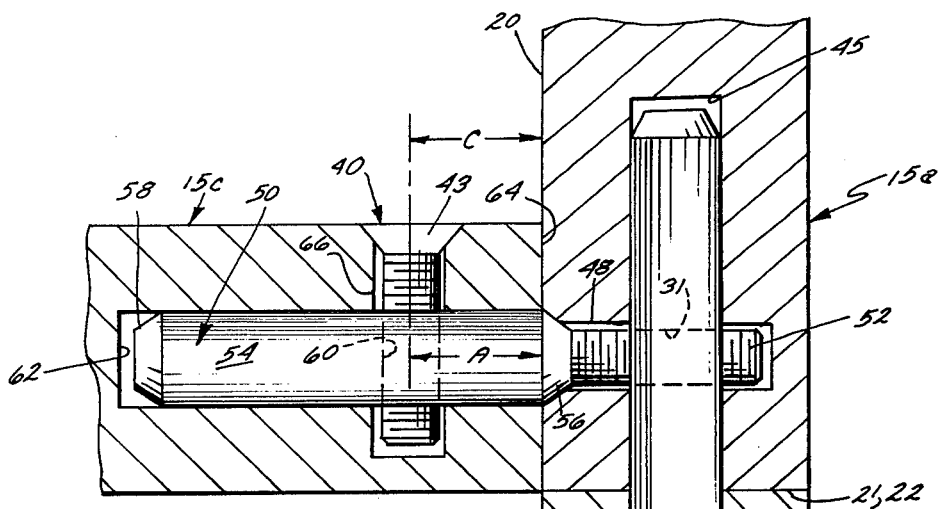
FIG. 7 is a fragmentary, cross-sectional plan view of another arrangement of the movable wall partitions joined with the present inventive system utilizing the connectors of FIGS. 3 and 6.

Other arrangements of the movable wall partitions 12 through 15 are also available. Thus, as shown in FIGS. 2 and 7, an additional partition 15c is abutted perpendicularly against one of two rectilinearly abutting partitions 15a and 15b to form a T-shaped arrangement. The arrangement of FIG. 7 is accomplished by utilizing a unitary connector 30 extending between aligned opposing apertures 45 and 46 formed in abutting edges 21, 22 of panels 15a and 15b. A threaded pin is received in one of the threaded apertures in connector 30, in this case threaded aperture 32 through an oversized, countersunk hole 47 in partition 15b. In place of the second threaded pin 40 which was received in threaded aperture 31 in the arrangement shown in FIG. 4, a second embodiment 50 of the elongated, cylindrical connector having a threaded extension 52 is received through oversized, countersunk hole 48 in threaded aperture 31 in connector 30.

Figures 6, 8:
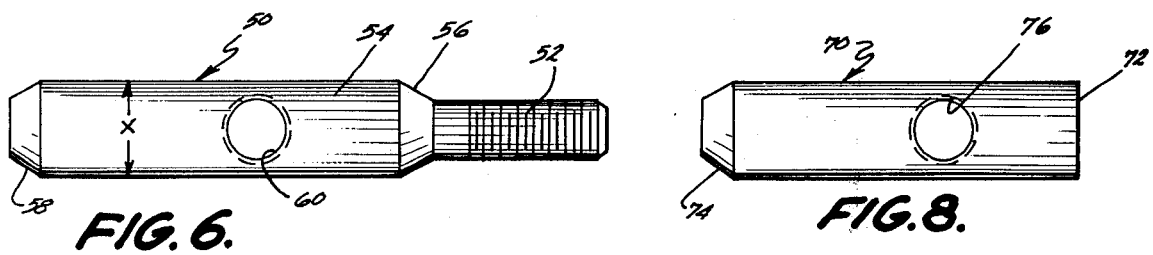
FIG. 6 is a front elevation of another embodiment of the elongated connector of the present invention.
FIG. 8 is a front elevation of another embodiment of the elongated connector of the present invention.

As shown in FIGS. 6 and 7, connector 50 has a smoothsided portion 54 having a diameter X corresponding to the diameter of connector 30 as shown in FIG. 5. The diameter of the threaded extension 52 is less than diameter X of portion 54, portions 52 and 54 being joined by a conical surface 56 corresponding in size to the conical surfaces 43 of tapered heads 42 of threaded pins 40. The end of connector 50 opposite the threaded extension 52 includes a beveled surface 58 corresponding to beveled surfaces 33 and 34 of connector 30. Also a threaded aperture 60 extends through connector 50 perpendicular to the longitudinal axis thereof.

As shown in FIG. 7, threaded extension 52 of connector 50 is received in threaded aperture 31 of connector 30 with smoothsided portion 54 extending normally to the surface 20 of partition 15a. A third partition 15c is abutted perpendicularly against surface 20 of partition 15a and is connected thereto via portion 54 of connector 50. Partition 15c includes an aperture 62 formed in an abutting side edge 64 and corresponding in size to apertures 45 and 46 of partitions 15a and 15b. Communicating with aperture 62 is a transverse hole 66 formed perpendicularly to the longitudinal axis of aperture 62. Hole 66 is countersunk and oversized in a manner identical to holes 26 and 27 of the arrangement of FIG. 4.

As will now be understood, when connector 50 is threaded into aperture 31, conical surfaces 43 and 56 wedge partitions 15a and 15b tightly together in a rectilinear relationship. Thereafter, portion 54 of connector 50 is inserted in aperture 62 and another threaded pin 40 having a conical surface 43 is threaded into aperture 60 in connector 50. Since prior to the tightening of the pins, the center of hole 66 is spaced from edge 64 a distance corresponding to the distance C in FIG. 3 and the center of threaded aperture 60 is spaced from the end of conical surface 56 a distance corresponding to distance A in FIG. 3, conical surface 43 of threaded pin 40 in partition 15c will contact the countersunk portion of hole 66 and wedge partition 15c tightly, perpendicularly against surface 20 of partition 15a. Accordingly, the distances A and C are equalized as shown in FIG. 7 after tightening and the pins 40 and extension 52 are therefore centered in holes 47, 66, and 48 respectively. Consequently, the use of connector 50 in place of one of the threaded pins 40 in partition 15a allows the third partition 15c to be securely joined in a T-shaped relationship to the two other rectilinearly abutting partitions 15a and 15b.

Figure 9:
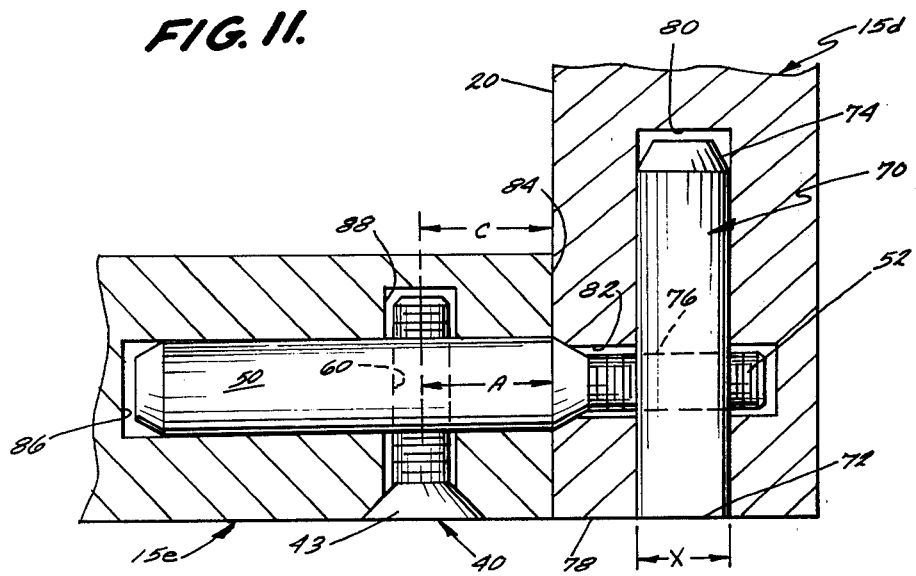
FIG. 9 is a fragmentary, cross-sectional plan view of yet another arrangement of the movable wall partitions joined with the connectors shown in FIGS. 6 and 8.

In a manner similar to that described for the arrangement in FIG. 7, two partitions may be arranged perpendicularly to one another using a third embodiment 70 of the elongated, cylindrical connector shown in FIGS. 2 and 9. As shown in FIGS. 8 and 9, connector 70 is a solid, right circular cylinder having a length approximately one-half the length of connector 30. Connector 70 includes a non-beveled end 72, a beveled end 74, and a threaded aperture 76 extending transversely of the longitudinal axis of the connector. Further, connector 70 has smooth sides and a diameter X corresponding to that of the other connectors.

To form the arrangement shown in FIG. 9, connector 70 is received in an aperture 80 formed in the edge 78 of the representative partition 15d. Threaded extension 52 of a connector 50 is received through a countersunk, oversized hole 82 formed transversely to and communicating with aperture 80 through surface 20 of partition 15d. Thereafter, another partition 15e having an abutting edge 84 is abutted against surface 20 of partition 15d with the smooth-sided portion 54 of connector 50 being received in an aperture 86 formed in edge 84. Finally, another threaded pin 40 is received through a transverse, oversize, countersunk hole 88 which communicates with aperture 86 in threaded aperture 60. Since before the tightening of the pins, the center of aperture 60 is spaced a distance A from the end of the conical surface 56 and the center of hole 88 is spaced a larger distance C from the abutting edge 84 of partition 15e, the threading of pin 40 into aperture 60 wedges conical surface 43 against the countersunk area of hole 88 such that distances A and C are equalized as shown in FIG. 9 and the entire partition 15e is wedged tightly and securely against surface 20 of partition 15d. Consequently, partition 15e is retained in a secure perpendicular relationship to partition 15d.

Yet another arrangement of the partition system is shown in FIGS. 2 and 12 wherein partitions 15f and 16a each perpendicularly abut an intermediate partition 14a. Partitions 15f and 16a extend parallel to and in alignment with each other in opposite directions from partition 14a. This arrangement is accomplished by utilizing an elongated connector 90 which is similar in all respects to connector 50 except that it includes a threaded extension 92 which has a length greater than the thickness of partition 14a.

Figure 10:
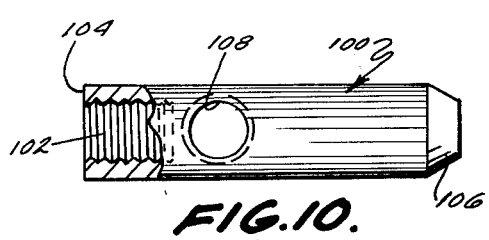
FIG. 10 is a front elevation shown partially in cross section of yet another embodiment of the elongated connector of the present invention.
Figure 11:
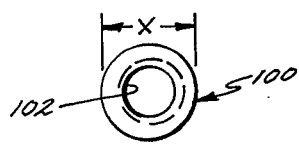
FIG. 11 is an end elevation of the connector shown in FIG. 10.

In conjunction with connector 90, a connector 100 is used which includes a threaded receptacle 102. As is shown in FIGS. 10, 11, and 12, connector 100 is similar in all respects to connector 70 except that it includes the threaded receptacle 102 formed in the non-beveled end 104 thereof. Connector 100 also has a diameter X corresponding to that of the other connectors, a beveled end 106, and a threaded aperture 108 extending transversely of the longitudinal axis thereof.

To form the arrangement shown in FIG. 12, threaded extension 92 is threadably received in receptacle 102 in connector 100 such that threaded apertures 96 and 108 in connectors 90 and 100, respectively, are spaced slightly closer together than are oversize, countersunk holes 118 and 120 communicating with apertures 112 and 114 in partitions 16a and 15f respectively, when the partitions are loosely abutting intermediate partition 14a. Partitions 15f and 16a are then abutted against partition 14a with connector 100 received in an aperture 112 formed in edge 110 of partition 16a while the larger diameter smooth-sided cylindrical section 94 of connector 90 is received in a correspondingly shaped aperture 114 formed in abutting edge 116 of partition 15f. Extension 92 is received through the entire thickness of partition 14a via an aperture 115 extending normally to surfaces 19 and 20 of that partition. Conical surface 98 between portions 92 and 94 of connector 90 is received in a countersunk portion of aperture 115. Thereafter, threaded pins 40 are received through holes 118 and 120 in threaded apertures 108 and 96. As in the other arrangements described herein, the spacing of the respective holes and threaded apertures forces the tapered heads of the pins to engage the countersunk portions of holes 118 and 120 thereby wedging partitions 16a and 15f towards one another and tightly against surfaces 19 and 20 of partition 14a. Consequently, both partitions 16a and 15f securely abut partition 14a with no visible cracks along the joints therebetween.

As will now be apparent, the partition system of the present invention provides a convenient and versatile means for securing together even large and heavy movable wall partitions. The system utilizes various embodiments of the elongated cylindrical connector, namely, embodiments 30, 50, 70, 90, and 100 as described herein, and the threaded pins 40 having tapered heads to wedge either two or three of the movable partitions together in varying relationships. By interchanging these various parts, entire partition systems may be quickly assembled in a manner which causes the various partitions to tightly abut one another and which eliminates visible cracks therebetween.

While several forms of the invention have been shown and described, other forms will now be apparent to those skilled in the art. Therefore, it will be understood that the embodiments shown in the drawings and described above are merely for illustrative purposes, and are not intended to limit the scope of the invention which is defined by the claims which follow.

The embodiments of the invention in which an exclusive property or privilege is claimed are defined as follows:

1. A partition system comprising: at least two movable partitions; a connector having a first axis extending from one of said partitions to the other, said connector including at least one pin-receiving aperture extending therethrough generally transverse to said first axis; an aperture in one of said partitions extending into said partition from a first surface generally adjacent the other of said partitions; the other of said partitions and said connector including securing means cooperating to secure said connector thereto with said connector projecting therefrom and into position in said aperture in said one partition; said one partition also including an opening extending generally laterally of said aperture through a second surface of said one partition and communicating with said aperture; a pin having a shank of a predetermined cross-sectional area and an enlarged head, said head tapering outwardly from said shank; said opening having a tapered area receiving said head; said pin being received in said pin-receiving aperture of said connector, through said opening; the center of said tapered area being offset from the center of said pin-receiving aperture in a direction away from said first surface of said one partition such that contact between said head and tapered area of said opening, combined with the fact that said pin is positioned in said pin-receiving aperture of said connector and said connector is secured to said other partition, wedges said one partition tightly against said other partition.

2. The system of claim 1 wherein said aperture extending into said first surface of said one partition is perpendicular to said first surface.

3. The system of claim 1 wherein said securing means includes said other partition also including a first surface generally adjacent said one partition, a second surface, an aperture extending into said first surface, and an opening having a tapered area extending through said second surface generally laterally of said aperture in said first surface and communicating therewith; said opening also including a tapered area; said connector being received in said apertures in said first surfaces of both of said partitions; said connector including two of said pin-receiving apertures; one pin-receiving aperture located in each of said partitions; one of said pins being received in each of said pin-receiving apertures such that said partitions are wedged tightly together via the heads on said pins engaging the tapered areas of said openings.

4. The system of claim 1 wherein said one partition abuts perpendicularly and is wedged tightly against the other of said partitions.

5. The system of claim 1 wherein said other partition includes two substantially parallel exterior surfaces, an edge therebetween which is generally perpendicular to one of said surfaces, a receptacle in said edge and normal thereto, and a countersunk opening extending perpendicularly through one of said exterior surfaces and communicating with said receptacle; said elongated connector including a smooth surfaced cylindrical section, a coaxial threaded extension and a conical surface therebetween; said receptacle in said other partition receiving a smooth surfaced cylinder having a threaded aperture extending generally transverse to the longitudinal axis thereof; said threaded aperture in said cylinder being generally aligned with said opening in said other partition; said threaded extension being freely received through said opening in said other partition and threadably received in said threaded aperture in said cylinder with said conical surface received in said countersunk area of said opening in said other partition; said one partition abutting and wedged tightly normally against said other partition via said enlarged tapered head of said pin received in said elongated connector in said one partition and engaging said tapered area of said opening in said one partition.

6. The system of claim 1 wherein said connector is a right, circular cylinder.

7. A partition system comprising: at least two movable partitions; an elongated connector means extending between at least said two partitions and having a first axis extending therebetween, and at least two pin-receiving apertures therein extending generally transverse to said first axis; said partitions each having an abutting surface, a second surface generally adjacent said abutting surface, a receptacle extending through said abutting surface corresponding in shape to said connector means, and an opening extending through said second surface and communicating with said receptacle; said connector means received in said receptacles and including pins freely received through said openings and received in said pin-receiving apertures in said connector means; said pins including wedge means engaging at least a portion of the peripheries of said openings whereby said partitions are wedged toward one another; said openings and pin-receiving apertures each including a central axis; said central axis of each of said openings being offset from said central axis of said respective pin-receiving aperture located in the same partition in which said opening is located in a direction away from said abutting surfaces whereby contact between said pin wedge means and said opening peripheries, combined with the fact that each said pin is received in its respective pin-receiving aperture in said connector means tends to align and make coaxial said central axes of said openings and pin-receiving apertures.

8. The system of claim 7 wherein said connector means comprises a right circular cylinder; said receptacles comprising cylindrical holes having circular cross sections bored in said partition edges.

9. The system of claim 7 wherein said pins comprise screws having threaded shanks; said pin-receiving apertures being threaded to correspond to said screw shanks; said wedge means comprising enlarged heads on said screws which are tapered outwardly from said shanks toward one end of said screws to form conical surfaces; said openings being cylindrical holes having circular cross sections and diameters slightly larger than the outside diameters of said threaded shanks; said openings also being countersunk such that after said screws are received through said slightly oversized openings and are screwed into said threaded apertures, said conical surfaces engage said countersunk portions of said openings and wedge said partitions toward one another.

10. The system of claim 7 wherein said openings are sufficiently larger than said pins in cross-sectional area to allow said pins to be received in said pin-receiving apertures prior to the engagement of said wedge means with said peripheries of said openings even though said central axes of said respective pin-receiving apertures and openings are offset.

11. The system of claim 7 wherein said receptacles extend into said partitions normally to said abutting surfaces, said receptacles being aligned with one another in said respective partitions such that said connector means extends rectilinearly therebetween.

12. The system of claim 7 wherein said partitions are separated by and abut and wedge against a member interposed therebetween; said member including a connecting aperture therethrough aligned with said openings; said connector means extending through said connecting aperture to support said partitions on either side of said member.

13. The system of claim 12 wherein said member is a third partition incuding two generally parallel surfaces; said connecting aperture extending through said third partition substantially normally to said surfaces; said connector means comprising two right circular, cylindrical portions; one portion including a threaded extension extending through said connecting aperture; said other portion including a threaded receptacle coaxial with the longitudinal axis thereof; said threaded extension being threadably received in said threaded receptacle in said other portion; each of said portions including one of said pin-receiving apertures.

14. The system of claim 7 wherein one of said pin-receiving apertures receives a threaded extension of a separate connector means having an elongated section coaxial therewith and having a longitudinal axis; said separate connector means replacing one of said pins in one of said two partitions; said elongated section received in a correspondingly shaped receptacle in an abutting surface of a third partition; said abutting surface of said third partition being wedged tightly against one of said second surfaces of said two partitions; said elongated section incuding a pin-receiving aperture extending generally transverse to the longitudinal axis of said section; said pin-receiving aperture receiving a third pin having a wedge means engaging the periphery of an opening through which said pin extends, said opening being formed in a second surface of said third partition and communicating with said receptacle therein; said separate connector means including a tapered section engaging the periphery of one of said openings in said one of said two partitions and cooperating with said pin in the other of said two partitions to wedge said two partitions tightly against one another; said third pin wedging said third partition tightly against said one partition.

15. A partition system comprising: at least two partitions; a connector; means securing said connector to one of said partitions; an aperture in the other of said partitions, said connector extending into said aperture; a passageway opening in said other partition communicating with said aperture; a wedge surface on said other partition; wedge means and threaded joining means joining said wedge means to said connector through said passageway opening whereby said wedge means can be progressively threaded towards said connector; said wedge surface being positioned such that when said wedge means is joined to said connector and is progressively threaded theretowards by said threaded joining means, said wedge means engages said wedge surface and forces said other partition toward said one partition, said wedge means comprises a tapered head on a threaded pin and said joining means comprises said threaded pin and a threaded aperture in said connector; said wedge surface comprising a tapered, countersunk area in said passageway opening; said tapered countersunk area having a center offset away from said one partition farther than the center of said threaded aperture in said connector whereby when said threaded pin is tightened into said threaded aperture, said tapered head wedges against one side of said tapered countersunk area.

16. The system of claim 15 in which said passageway opening is on center with said tapered countersunk area and is larger in diameter than said threaded pin whereby said pin extends through said passageway opening into said threaded aperture area through said centers of said threaded aperture and said passageway opening are offset.

* * * * *